(12) United States Patent
Passler et al.

(10) Patent No.: US 12,504,499 B1
(45) Date of Patent: Dec. 23, 2025

(54) ENCOMPASSING ELLIPSE FOR DUAL LOCATION SOLUTIONS

(71) Applicant: SR Technologies, Inc., Sunrise, FL (US)

(72) Inventors: Mark Passler, Sunrise, FL (US); Reese Boucher, Sunrise, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 19/304,284

(22) Filed: Aug. 19, 2025

Related U.S. Application Data

(60) Provisional application No. 63/688,526, filed on Aug. 29, 2024.

(51) Int. Cl.
  *G01S 5/14* (2006.01)
  *G01S 5/12* (2006.01)

(52) U.S. Cl.
  CPC . *G01S 5/12* (2013.01); *G01S 5/14* (2013.01)

(58) Field of Classification Search
  CPC ............. H04W 12/06; G01S 1/24; G01S 5/04
  See application file for complete search history.

(56) References Cited

U.S. PATENT DOCUMENTS

| | | | |
|---|---|---|---|
| 10,345,428 B1* | 7/2019 | Oden | G01S 5/0221 |
| 12,149,935 B1* | 11/2024 | Monteagudo Notario | H04W 12/069 |
| 2025/0283995 A1* | 9/2025 | Steinberg | G01S 13/0218 |

* cited by examiner

*Primary Examiner* — Michael T Vu
(74) *Attorney, Agent, or Firm* — Goodwin Procter LLP

(57) ABSTRACT

Methods and apparatus are disclosed for determining a confidence ellipse (CEP) that encompasses possible locations of one or more target devices, which is a condition that may exist when a wireless device (WD) is initially travelling on an effectively straight path. The method includes calculating the deviation from the straight line path for the WD. If it is determined that the path is effectively a straight line, the calculation of the sum of squared residuals (SSRs) is extended so as to encompass two possible minima. A grid is then derived comprising all ground plane points, where the SSR values are (i) less than a boundary value and (ii) include the SSRs corresponding to the two possible minima. The grid is converted into a polygon, which is further converted into an ellipse displayed as the CEP. The CEP encompasses two possible locations of a target device.

20 Claims, 11 Drawing Sheets

ENCOMPASSING ELLIPSE FOR DUAL LOCATION SOLUTIONS

CROSS REFERENCE TO RELATED APPLICATION

This application claims the benefit of U.S. Provisional Patent Application No. 63/688,526, titled "Encompassing Ellipse for Dual Location Solutions," and filed on Aug. 29, 2024, the entire content of which is incorporated by reference herein.

TECHNICAL FIELD

The present disclosure relates to geo-location of wireless devices, and in particular to a method, device, and system for the geo-location of wireless devices.

BACKGROUND

The location of a wireless device may be determined by various methods. These methods may be classified as active, passive and combined active and passive. In an active location scheme, a device that is determining the location or range (i.e., a wireless measuring station), transmits certain packets (e.g., request packets) to a device being located (i.e., a target station). A common method is to measure a time of arrival (TOA) of the response packet from the target station and compare that to a time of departure (TOD) of the request packet sent by the wireless measuring device, so as to determine a round trip time (RTT).

In an active location scheme, the TOD may be measured for a packet that is transmitted from the wireless measuring station addressed to the target station. The TOA of the response packet from the target station at the wireless measuring station is also measured. If the turnaround time for the target station to receive the packet from the wireless measuring station and to start to transmit the response is known, or is known to be a constant, then the time difference at the wireless measuring station between the TOA and the TOD, minus the turnaround time at the target station will be directly proportional to twice the distance of the target station from the wireless measuring station.

For example, when the target station is a wireless device based upon IEEE 802.11 technology, and the packet transmitted from the wireless measuring station to the target station is a data packet, the response from the target station will most likely be an acknowledgement (ACK) packet. If the packet transmitted from the wireless measuring station to the target station is a control packet (e.g., a request-to-send (RTS) packet), the response from the target station will most likely be a clear-to-send (CTS) packet. In these two examples, the turnaround time at the target station is defined in the IEEE 802.11 standard as the short interframe spacing (SIFS), which is a preset value. Hence, the propagation time, td, between the wireless measuring station and the target station, can be determined from the calculation of td=(RTT−SIFS)/2. More specifically, the distance d between the wireless measuring station and the target station is equal to td×c, where c is the speed of light, i.e., $$d = td \times c. \quad (1).$$

In another example, where the target station is a wireless device based upon Bluetooth® technology[1], and the packet transmitted from the wireless measuring station (acting as a master device) to the target station (acting as a slave device) is a Poll packet, the response from the target station will mostly likely be a Null packet. Timing for time slots are negotiated initially; however, the target station timer will be delayed by the propagation time, d/c, relative to the wireless measuring station. Thus, responses (e.g., Null packets) from the target station arrive at the wireless measuring station delayed by the propagation time d/c. Accordingly, Null packets from the target station arrive delayed by a total of d/c from slave timer delay plus d/c from the travel time (i.e., 2*d/c) after accounting for the 625 microseconds (µs) difference in the master time slot compared to the slave time slot.

This method of calculating the distance to a target station by measuring the TOD and TOA, accounting for the turnaround time, and calculating the RTT is well known.

Reference is now made to FIG. 1, which is a diagram of an example of a wireless measuring station 110, travelling in a straight path from point A 101 to point E 105, measuring RTTs and calculating the distances d to a target station 120 located at position G 108. When wireless measuring station 110 is at position A 101, the calculated distance to the target station 120 is d1 131. When wireless measuring station 110 is at position B 102, the calculated distance to the target station 120 is d2 133. Similarly, when wireless measuring station 110 is at position D 104, the calculated distance to the target station 120 is d4 135. As different RTTs are measured, e.g., at positions A 101, B 102, C 103, D 104, and E 105, the location of the target

[1]The Bluetooth system is specified in "Specification of the Bluetooth® System, Covered Core Package Version: 5.0, Publication Date: Dec. 6, 2016 ("Specification of the Bluetooth® System"). station 120 may be estimated with improving accuracy. However, there are two possible locations, that is, the real location at G 108 as well as a mirror image location at H 109. For example, when wireless measuring station 110 is at position A 101, the calculated distance to mirror location H 109 is also d1 132. Similarly, when wireless measuring station 110 is at position B 102, and D 104, the calculated distances to location H 109 are also d2 134 and d4 136, respectively. Hence, while the wireless measuring station 110 is travelling in a straight line or on a path that has little deviation, there will always exist two possible locations for the target station, i.e., in this example, G 108 and H 109.

In order to derive an estimated position for target station 120, the determination of a best fit to the RTT measurements is required. To better understand the present disclosure, and the attendant advantages and features thereof, the conventional method for fitting the RTT measurements to a target position by minimizing the sum of the squared residuals (SSR) will be described in reference to FIG. 1. However, because this method for fitting the RTT measurements to a target position by minimizing theسum of the squared residuals (SSR) is known, it will only be described at a high level of generality.

Assume there are N measurements with index i of the RTT (i.e., $RTT_i$) from the wireless measuring station 110 to the target station 120. For an arbitrary target location, the RTT may be modelled by a function $f(x_i, a)$ where vectors $x_i$ are the known locations of the mobile wireless measuring station 110, including latitude $x_i^{LAT}$, longitude $x_i^{LON}$, and/or altitude $x_i^{ALT}$. The parameter vector a defines the estimated location of the target station 120 in terms of latitude $\alpha^{LAT}$, longitude $\alpha^{LON}$, and/or altitude $\alpha^{ALT}$. Additional parameters may include a turnaround offset $\alpha^{OFF}$ to be determined, where $\alpha^{OFF}$ corresponds to the packet turnaround time of the target station 120.

The target location $\alpha^{LAT}$, $\alpha^{LON}$, $\alpha^{ALT}$, and turnaround offset $\alpha^{OFF}$ may be determined by first defining a squared residual $SR(rtt)_i$. $SR(rtt)_i$ is the square of the difference between the measurement of $RTT_i$ and the computation of total travel time $f(x_i, \alpha)$:

$$SR(rtt)_i = [RTT_i - f(x_i, \alpha)]^2 \quad (2),$$

where [$RTT_i - f(x_i, \alpha)$] is the residual, $R(rtt)_i$ defined as the difference of RTT; from the computed distance multiplied by the factor (2/c) and modified by an offset to convert that distance to a model round trip time:

$$f(x_i, \alpha) = \alpha^{OFF} + \frac{2}{c}(d(x_i, \alpha)), \quad (3)$$

where $$d(x_i, \alpha) = \left[(x_i^{LAT} - \alpha^{LAT})^2 + ((x_i^{LON} - \alpha^{LON}) \times \cos(x_i^{LAT}))^2 + (x_i^{ALT} - \alpha^{ALT})^2\right]^{\frac{1}{2}}.$$

It may be noted that the speed of light is in units of geographic distance divided by the units of RTT. For example, if latitude and longitude are used for location and microseconds are used for RTT, then c=0.0027027 degrees/microsecond. Longitude distances are scaled by the cosine of the latitude to account for spherical coordinates. All distances are sufficiently small touse planar approximation without introducing significant errors.

If the errors are Gaussian, the optimal value for the target location parameters, «, may be obtained by minimizing the sum of the squared residuals $SSR(rtt) = \Sigma_i S R (rtt)_i$. This is defined by setting the gradient of the SSR to zero:

$$0 = \nabla_\alpha(\Sigma_i S R_i) = -2\Sigma_i[RTT_i - f(x_i, \alpha_i)][\nabla_\alpha f(x_i, \alpha)] \quad (4).$$

A Jacobian Jia may be defined as $J_{i\alpha} = \nabla_\alpha f(x_i, \alpha)$. The Jacobian Jia may be used to define the direction to a minimum, known as the Steepest Descent method. The Steepest Descent method may be used to define the direction and step size to the minimum, as in the Gauss-Newton method. Alternatively, the Steepest Descent method may be used to define the end stage direction and step size to the minimum, i.e., "minimum conditions," as in the Levenberg-Marquardt method.

Once this minimum is found, then a confidence ellipse, known as the "CEP", may be found using the Jacobian Jig evaluated with the parameter values determined by the fit. In the first step, the Hessian Ha' a may approximately be defined by $$H_{\alpha'\alpha} = \Sigma_i [J_{i\alpha}]^T J_{i\alpha} \quad (5).$$

followed by a correlation matrix $\beta_{\alpha'\alpha}$ defined as the inverse of the Hessian $H_{\alpha'\alpha}$:

$$\beta_{\alpha'\alpha} = H_{\alpha'\alpha}^{-1} \quad (6).$$

The CEP, comprising length, width, and orientation θ, may be defined for the resulting location, as per Table 1 below:

TABLE 1

| Location Confidence Ellipse parameters | |
| --- | --- |
| Tan (2 Θ) | 2 * $\rho_{01}$ / ($\rho_{00} - \rho_{11}$) |
| Length² | $\rho_{00}$ Cos(θ) Cos(θ) ǀ $\rho_{11}$ Sin(θ) Sin(θ) ǀ 2 $\rho_{01}$ Cos(θ) Sin(θ) |
| Width² | $\rho_{11}$ Cos(θ) Cos(θ) + $\rho_{00}$ Sin(θ) Sin(θ) − 2 $\rho_{01}$ Cos(θ) Sin(θ) |

As discussed above, a standard technique to determining the best fit to function $f(x_i, \alpha)$ is by minimizing the sum of squared residuals, SSR, also known as the least squared residuals. For non-linear functions $f(x_i, \alpha)$, there are various iterative methods that may be utilized such as Steepest Descent, Gauss-Newton, and Levenberg-Marquardt known in the art.

The aforementioned methods used to minimize the sum of squared residuals, such as the Gauss-Newton or the Levenberg-Marquardt method, are unable to identify both possible minima. As a result, these methods may converge on either the real location G 108 or the false location H 109, or, as the wireless measuring station 110 travels along a straight path, may oscillate between the real location G 108 and the false location H 109.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

The subject matter described herein relates to a method in a first wireless device (WD) for determining a confidence ellipse (CEP) that encompasses two possible locations of a second WD. More specifically, the positions of the first WD are recorded, and a measurement of round trip time (RTT) is measured at each position. A path deviation from a straight path of the first WD is calculated. It is determined whether the path deviation is less than a present value. If yes, a summation of squared residual (SSR) values is calculated to encompass two minima. A grid composed of all ground plane points for which the SSR values are less than a boundary value and include the SSR values corresponding to the two minima is derived. The ground plane points in the grid are then converted into a polygon that encompasses the grid, and this polygon can be converted into a CEP ellipse.

The present disclosure also teaches a wireless communication device configured to determine a confidence ellipse (CEP) that encompasses two possible locations of a target station. In some embodiments, the device comprises a wireless transmitter, a wireless receiver, a platform location module, one or more processors, and a data bus interconnecting the wireless transmitter, the wireless receiver, the platform location module, and the one or more processors. The one or more processors are configured to record positions of the wireless communication device and perform a measurement of round trip time (RTT) at each position. The one or more processors are also configured to calculate a path deviation from a straight path of the wireless communication device and determine whether the path deviation is less than a preset value. If it is determined that the path deviation is less than the preset value, the one or more processors are further configured to calculate a summation of squared residual (SSR) values to encompass two minima, derive a grid composed of all ground plane points for which the SSR values are less than a boundary value and include the SSR values corresponding to the two minima, convert the ground plane points in the grid into a polygon that encompasses the grid, and convert the polygon into a CEP ellipse.

The above and other preferred features, including various novel details of implementation and combination of events, will now be more particularly described with reference to the accompanying figures and pointed out in the claims. It will be understood that the systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each feature described herein, and each combination of two or more such features, is included within the scope of the present disclosure provided that the features included in such a combination are not mutually inconsistent. In addition, any feature or combination of features may be specifically excluded from any embodiment of any of the present inventions.

The foregoing summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
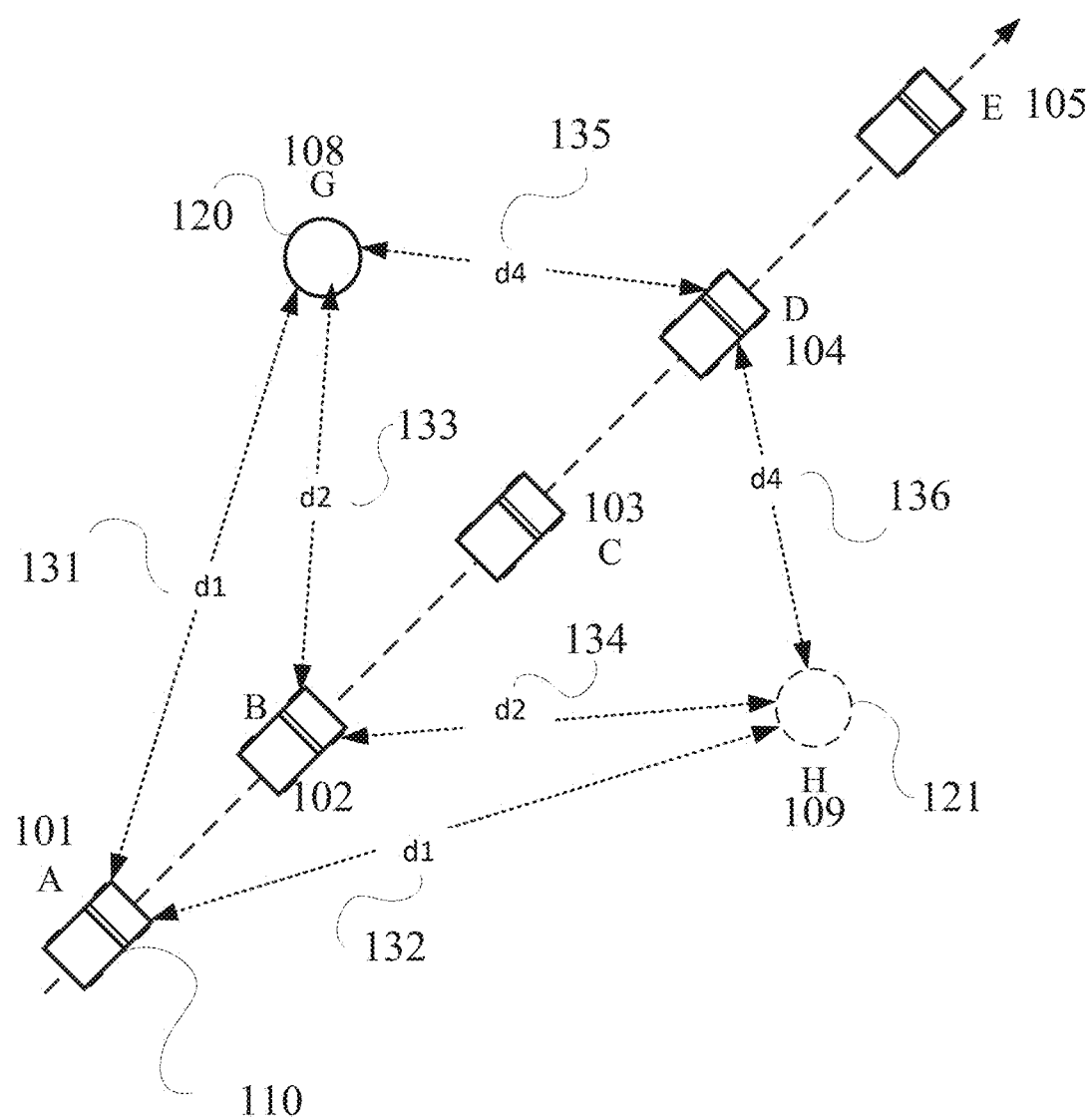
FIG. 1 is a diagram of an example of a wireless measuring station, travelling in a straight path from point A to point E, measuring round trip times (RTTs) and calculating distances d to a target station located at a position G relative to the wireless measuring station, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Methods and apparatus disclosed herein determine the presence of two minima in sums of squared residual (SSR) data, produce a confidence ellipse (CEP) that encompasses both minima, and identify the conditions under which the occurrence of two minima is likely present or absent.

Figure 2:
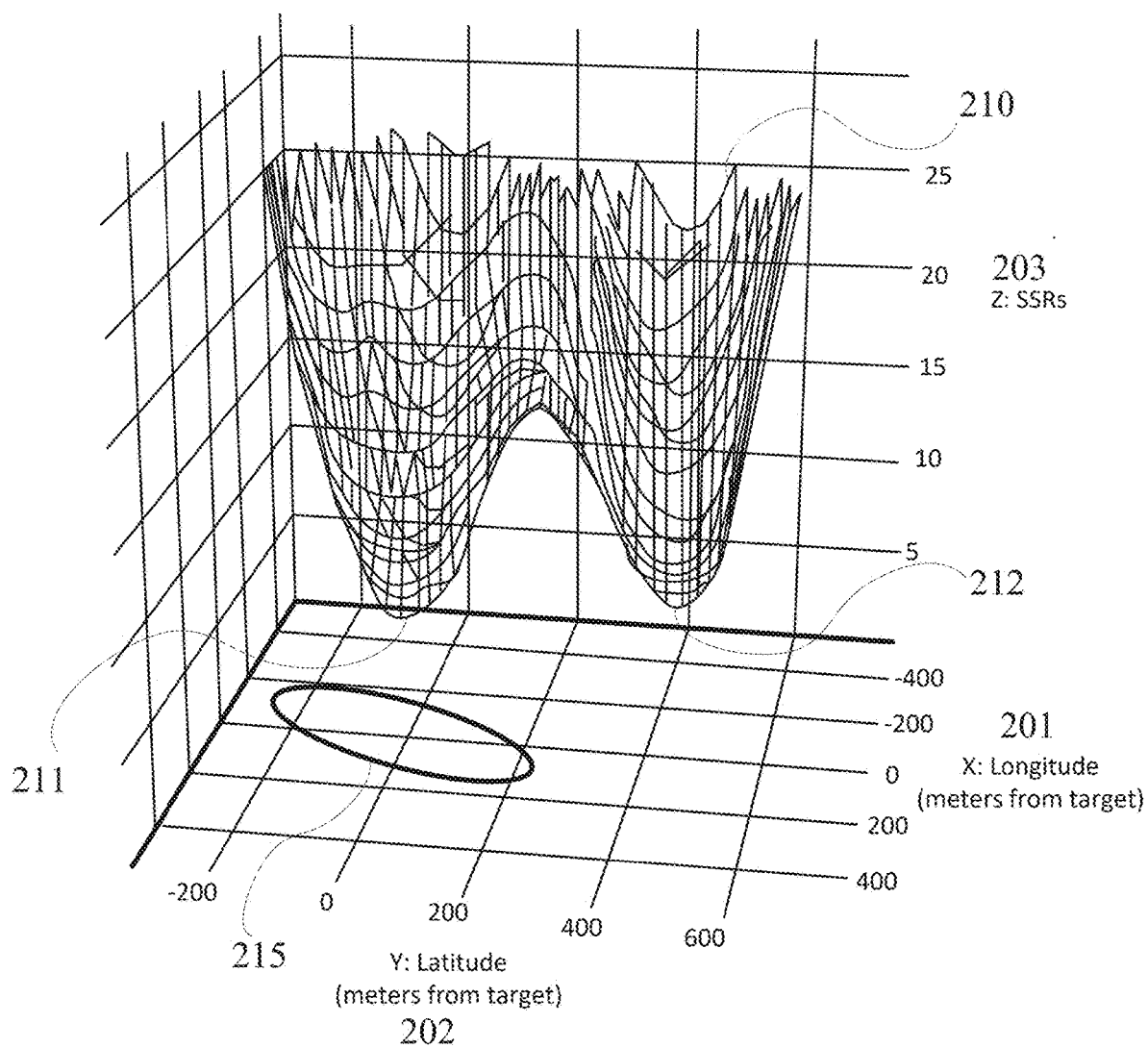
FIG. 2 is a three-dimensional diagram of example data representing sums of squared residual (SSR) values in which two minima are present, in accordance with some embodiments.

FIG. 2 is a three-dimensional (3D) diagram of example data 210 representing sums of squared residual (SSR) values in which two minima 211 and 212 are present. The data 210 can be collected, for example, when the wireless measuring station 110 has been travelling effectively in a straight line, as discussed above with reference to FIG. 1. In FIG. 2, the X axis 201 of the 3D diagram represents longitude values, the Y axis 202 represents latitude values, and the Z axis 203 represents the SSR values 210.

In the example of FIG. 2, the supposed CEP 215 corresponds to the SSR minimum 211. However, by extending the calculation of SSRs, the SSR values 210 show the presence of two minima, 211 and 212. The two minima are only present when an additional number of points (e.g., approximately 400 points) are taken above the standard set of calculations as described above with reference to equations (2) through (6). In general, the fit, as described above with reference to equation (4), would settle either on minimum 211 or minimum 212. In the example of FIG. 2, the fit resulting from the standard set of calculations settles on the minimum 211 and the resulting CEP 215, which may or may not be the correct CEP corresponding to the location of the target station 120. In other words, the standard set of calculations, as described above in reference to equation (4), is unaware of the existence of the two minima in the SSR data.

Figure 3:
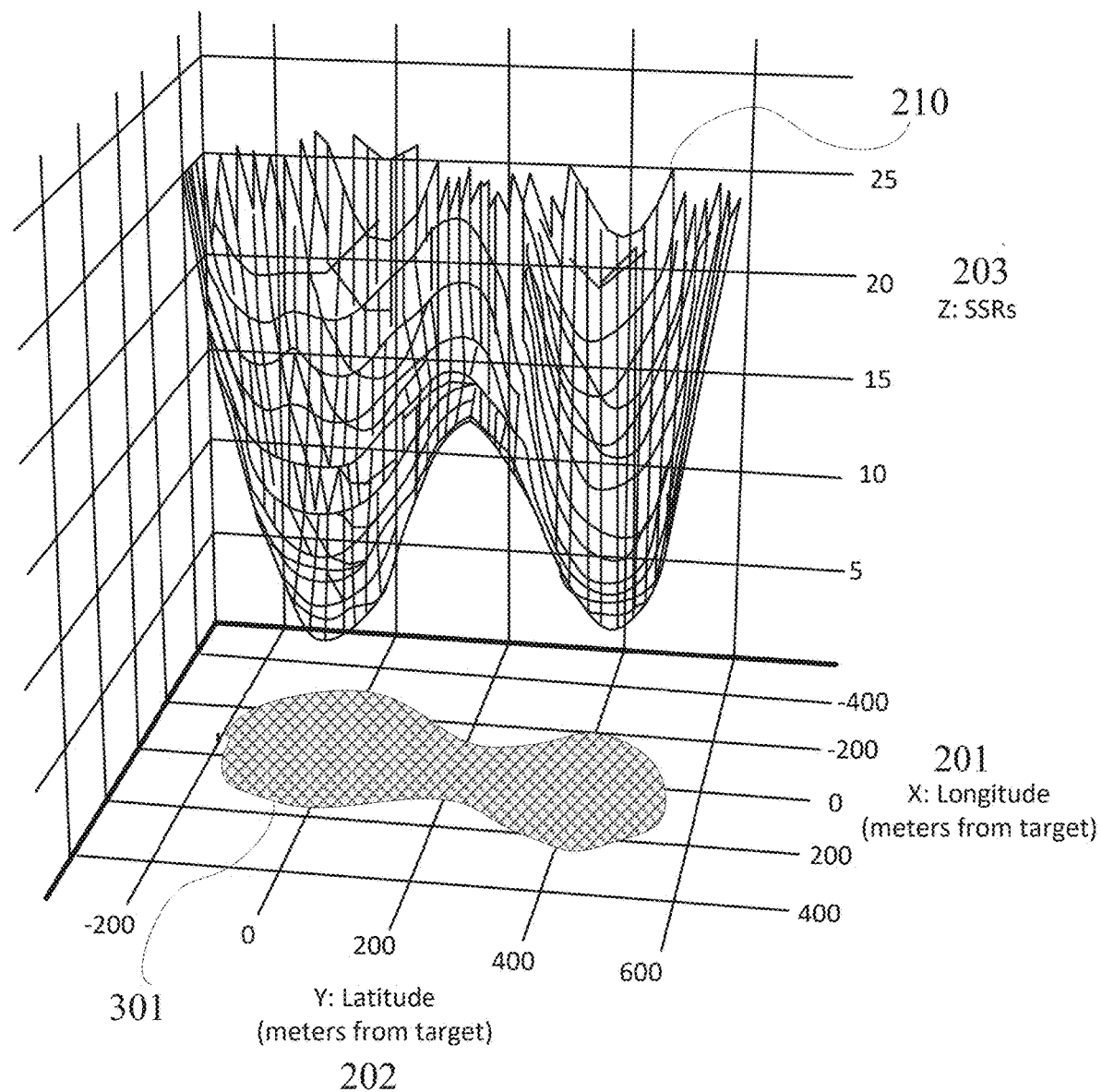
FIG. 3 is the three-dimensional diagram of example SSR data shown in FIG. 2 where a grid is composed of all ground plane points that the SSR is less than an average boundary value of the Levenberg-Marquardt covariance ellipse, in accordance with some embodiments.

FIG. 3 is the three-dimensional diagram of example SSR data shown in FIG. 2. In this example, grid 301 is composed of all ground plane points (i.e., on (X, Y) plane), where the SSR is less than the average boundary value of the Levenberg-Marquardt covariance ellipse. The shape of grid 301 may be derived as the minimum area region that includes a 95% containment probability corresponding to an average value of the SSR at the edges of a traditional confidence ellipse. The confidence ellipse, discussed above with reference to equations (5) and (6), can be defined by the curvature. The correlation matrix $\beta_{\alpha'\alpha}$, i.e., the inverse of the Hessian $H_{\alpha'\alpha}$ as shown in equation (6), can be defined only by the curvature at the best fit of the parameters and does not reflect the more complex behavior of the SSR away from the best fit point. Hence, the average SSR at the edge of the ellipse may define the contour to be used for grid 301. In other words, grid 301 on the (X, Y) plane includes the location of all points of the calculated SSRs that lie at or below the SSR of the CEP based upon the presumed curvature at point (0, 0). As shown in FIG. 3, the shape of grid 301 is irregular, resembling a peanut in this example. However, in general the CEP is always displayed as an ellipse, and hence it is necessary to convert this peanut shaped grid 301 into an equivalent ellipse.

Figure 4:
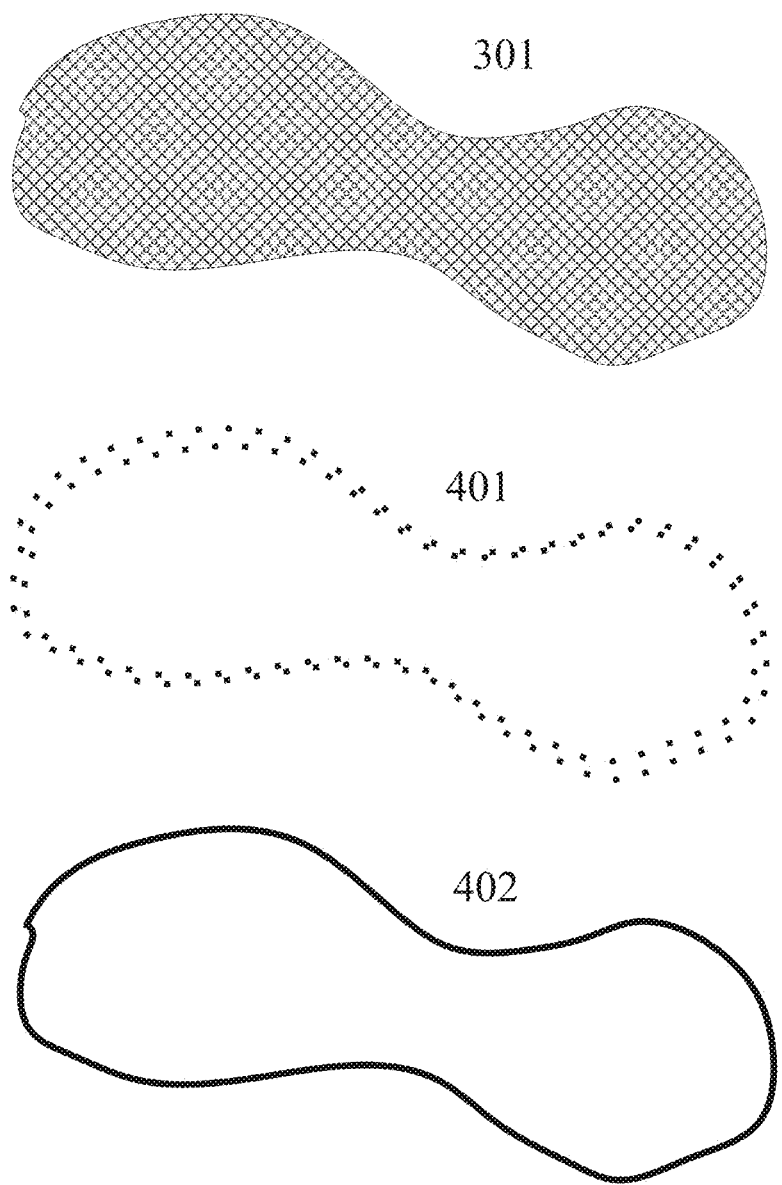
FIG. 4 is an example of the grid shown in FIG. 3 converted into a polygon, in accordance with some embodiments.

FIG. 4 is an example of grid 301 converted into a polygon. In order to convert grid 301 into an equivalent polygon, the interior points of the grid may first be determined and removed. For example, the outer two grid points, represented by boundary 401, are first identified, and then the smallest enclosing polygon 402 is derived from the extrema of the outer two grid points boundary 401.

A method to convert grid 301 into an equivalent eclipse is disclosed herein.

The first step is to remove from grid 301 any containing points that do not have second non-containing nearest neighbors on the grid, thereby producing an outer boundary 401 of two grid points. It should be noted, however, that using the first nearest neighbors may not ensure a continuous boundary. The grid points may be considered as both rows and columns, where the rows correspond to the X axis (longitude) 201, and the columns correspond to the Y axis (latitude) 202. A boundary refinement procedure may be applied first by rows and then by columns, and then repeated in a reverse order, so as to cater for non-convex shapes.

Figure 5:
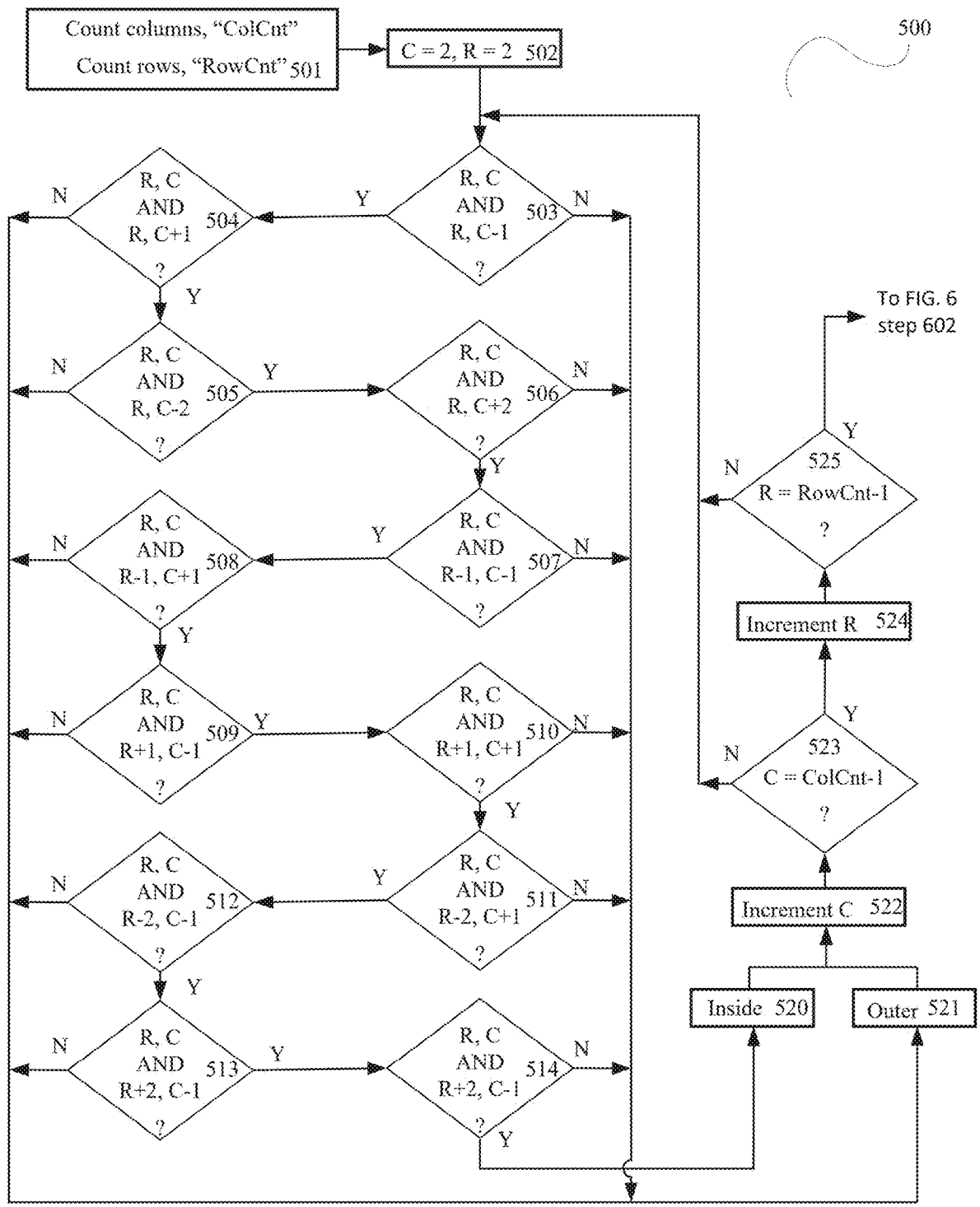
FIGS. 5 and 6 illustrate a flowchart of a procedure used to remove inner grid points and retain outer two points, in accordance to some embodiments.
Figure 6:
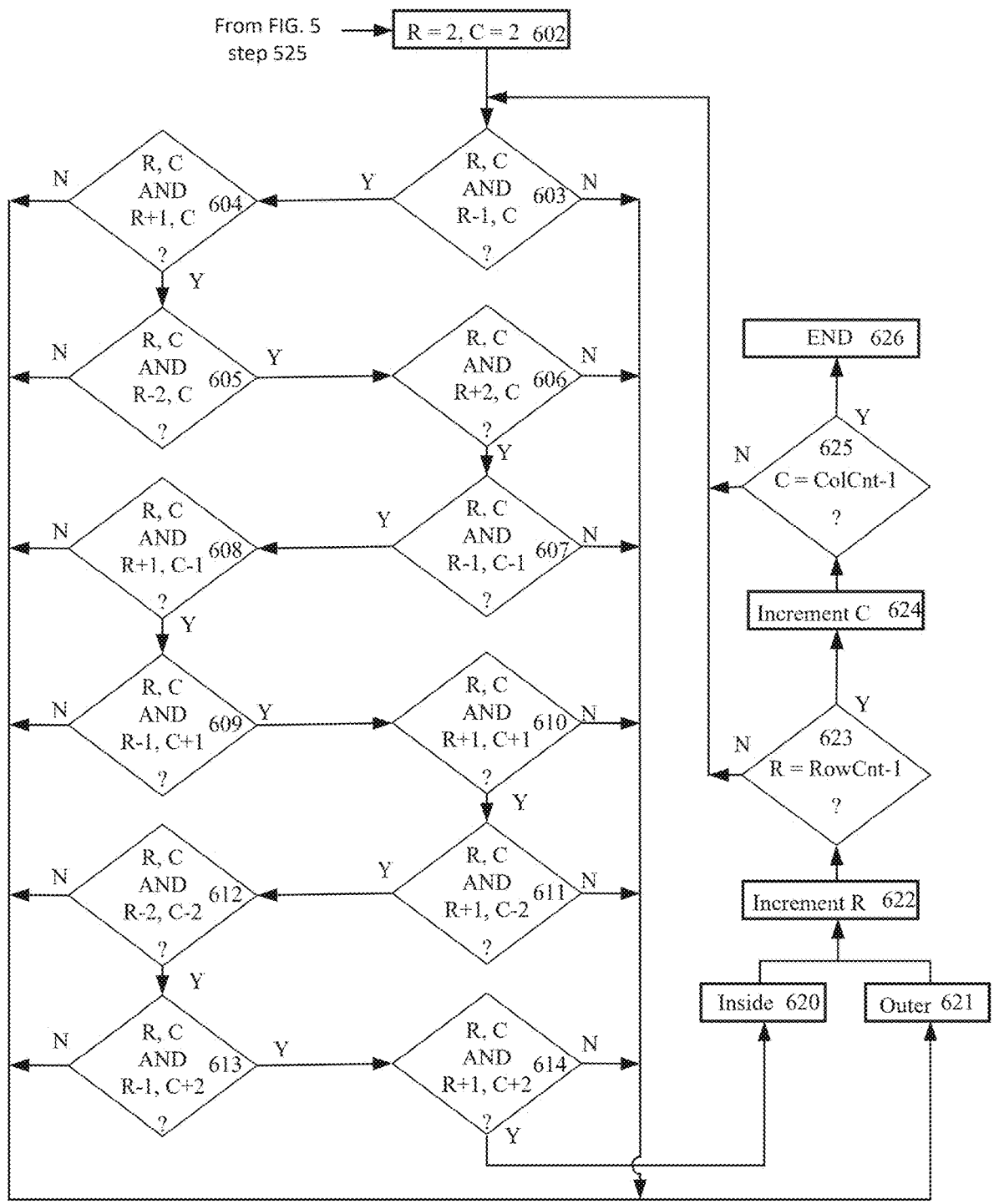

FIGS. 5 and 6 illustrate a flowchart of procedure 500 that can be used to remove the inner grid points and retain the outer two points. Procedure 500 begins with step 501 where the grid points are counted in columns and rows. The number of columns is stored as "ColCnt" and the number of rows as "RowCnt". At step 502, column 2 and row 2 are selected, i.e., C=2 and R=2. At step 503, if there is a grid point at (R, C) and a grid point at (R, C−1), the procedure 500 advances to step 504. At step 504, if there is a grid point at (R, C) and (R, C+1), the procedure 500 advances to step 505, and so on. Similarly, at steps 505 through 514, the procedure 500 determines if there are grid points at (R, C) and the following grid points: (R, C−2), (R, C+2), (R−1,C−1), (R−1,C+1), (R+1,C−1), (R+1,C+1), (R−2,C+1), (R−2, C−1), (R+2, C−1), and (R+2, C−1), respectively. If at each of these steps from 503 to 514, both grid points are present (i.e., the column and row are both populated), then at step 520, grid point (R, C) is assessed an "inside grid point" and is then removed. If at any step between 503 and 514, grid point (R, C) is present but the other grid point is not present, then at step 521, grid point (R, C) is assessed an "outer grid point" and is retained. At step 522, column number C is incremented. At step 523, the procedure 500 determines whether column number C is equal to (ColCnt−1) and, if not, then the procedure 500 returns to step 503. If all column numbers from C=2 to (ColCnt−2) have been used, then step 523 is followed by step 524, where the row number R is incremented. At step 525, the procedure 500 checks if row number R is equal to (RowCnt−1) and, if not, then the procedure 500 returns to step 503. If all row numbers from R=2 to (RowCnt−2) have been used, the procedure 500 proceeds to step 602 shown in FIG. 6, where R and C are both reset to 2.

Steps 603 to 614 of procedure 500 are similar to steps 503 through 514. At steps 603 through 614, the procedure 500 determines if there are grid points at (R, C) and the following grid points: (R−1, C), (R+1,C), (R−2,C), (R+2,C), (R−1,C−1), (R+1,C−1), (R−1,C+1), (R+1, C+1), (R−1, C+1), (R+1, C−2), (R−2,C+2), and (R+1,C+2), respectively. If at each of these steps (e.g., between steps 603 and 614, and similarly between steps 503 and 514), both grid points are present, then at step 620, grid point (R, C) is assessed as an "inside grid point" and can be removed. If at any of the steps 603 and 614, grid point (R, C) is present but the other grid point is not present, then at step 621, grid point (R, C) is assessed an "outer grid point" and is retained. At step 622, row number R is incremented. At step 623, the procedure 500 determines whether row number R is equal to (RowCnt−1) and, if not, the procedure 500 returns to step 603. If all row numbers from R=2 to (RowCnt−2) have been used, then the procedure 500 proceeds from step 623 to step 624, where the column number C is incremented. At step 625, the procedure 500 checks if column number C is equal to (ColCnt−1) and, if not, then the procedure 500 returns to step 603. If all row numbers C=2 to (ColCnt−2) have been used, then the procedure 500 proceeds to step 626 where it concludes.

After procedure 500, grid 301 is converted into the outer two grid points boundary 401 shown in FIG. 4.

The next step is a procedure for finding the enclosing polygon 402. A procedure may be used that searches for the next adjacent grid point in the outer two grid point boundary 401 and connects successive outer points by a line to form a continuous closed polygon. By way of example and not limitation, the procedure may start by selecting a point ($C_1$, $R_1$), where $C_1$ is the least value of column C, i.e., the leftmost or minimum value column point. From this point, a search for an adjacent point proceeds in a specific order, starting with the "up-left" direction, i.e., $C_2=C_1-1$, $R_2=R_1-1$. If no adjacent point is found, the search continues through the other seven possibilities in a clockwise rotation: "up" ($C_1$, $R_1-1$), "up-right" ($C_1+1$, $R_1-1$), "right" ($C_1+1$, $R_1$), "down-right" ($C_1+1$, $R_1+1$), "down" ($C_1$, $R_1-1$), "down-left" ($C_1+1$, $R_1-1$), and "left" ($C_1-1$, $R_1$), until the adjacent point is found and the values/coordinates for $C_2$, $R_2$ are set accordingly. This will establish a most recent direction of the connecting line, i.e., one of the above eight possibilities. A new search is then made for the next adjacent point, following the same rotation but starting with the point rotated clockwise by one point from the reverse direction. For example, if the previous two points were connected by the direction "up-left", "up", "up-right", "right", "down-right", "down", "down-left", or "left", then the search would start again with "down", "down-left" "left", "up-left", "up", "up-right", "right", or "down-right", respectively, until a new adjacent point is found. This process proceeds until one arrives back to the first point (e.g., the starting point) and the polygon 402 is produced.

Figure 7:
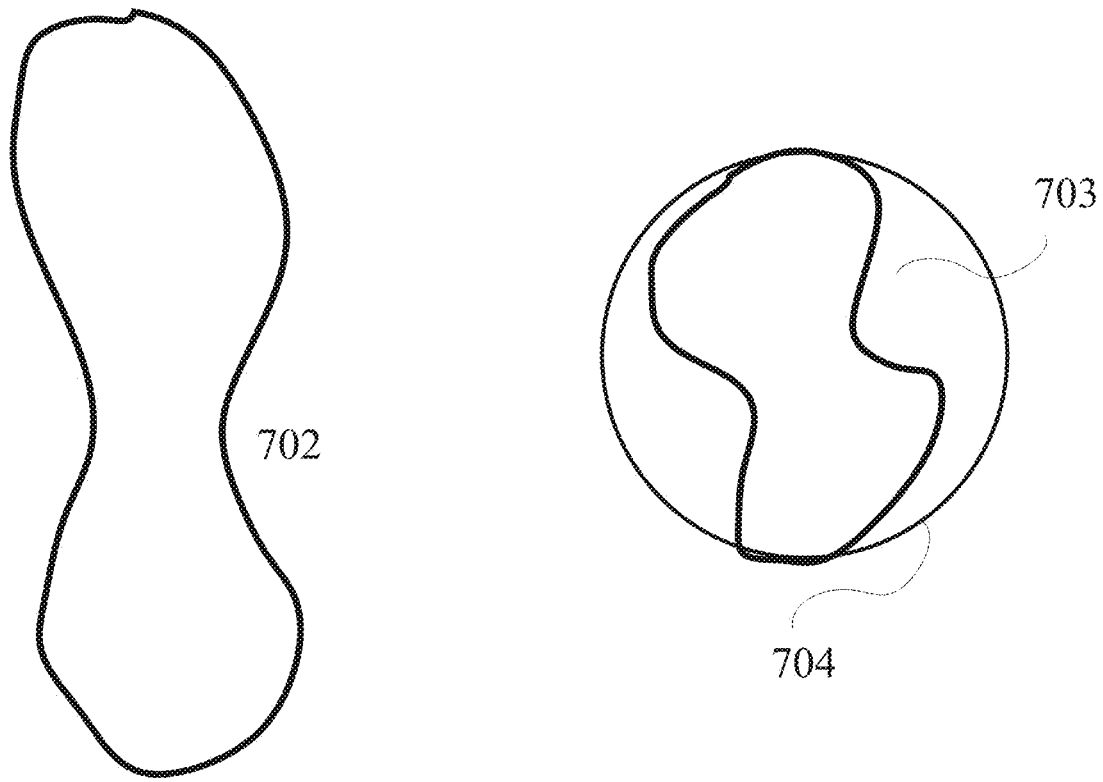
FIG. 7 illustrates examples of steps for producing a confidence ellipse (CEP) that encompasses a grid, in accordance with some embodiments.
Figure 7:
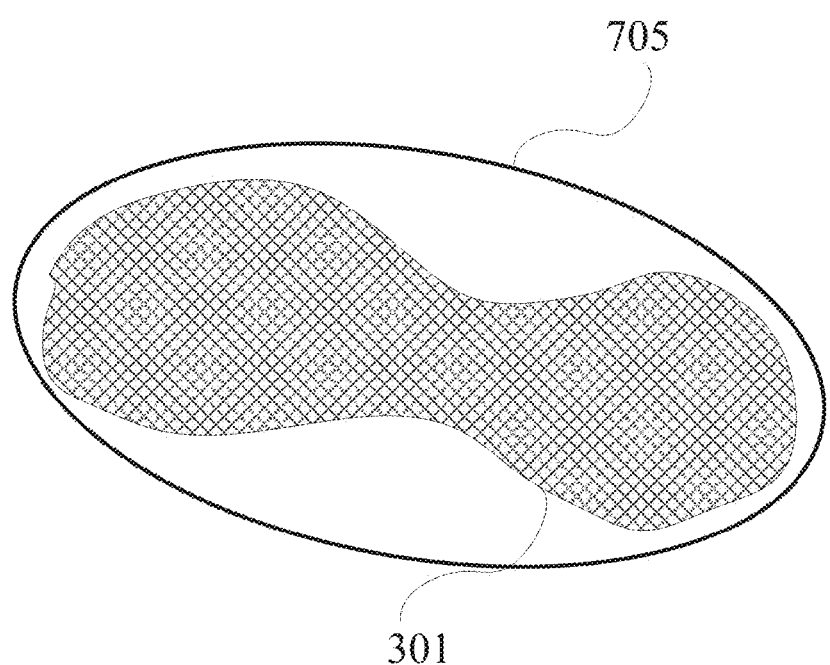

FIG. 7 depicts example steps for producing a CEP ellipse that encompasses grid 301. First, the principal axes of the second moment of the polygon 402 points are calculated. Polygon 702 is polygon 402 rotated such that the principal axes are aligned with the X longitude 201 and Y latitude 202. The x and y components of polygon 702 may then be adjusted or "squeezed," so that the x and y moments are the same size, resulting in polygon 703. From the polygon 703, the smallest enclosing circle 704 may be derived, for example, using Welzl's algorithm. The circle 704 may then be "unsqueezed" by reversing the x and y adjustments, and un-rotated, resulting in ellipse 705 that encompasses grid 301.

Figure 8:
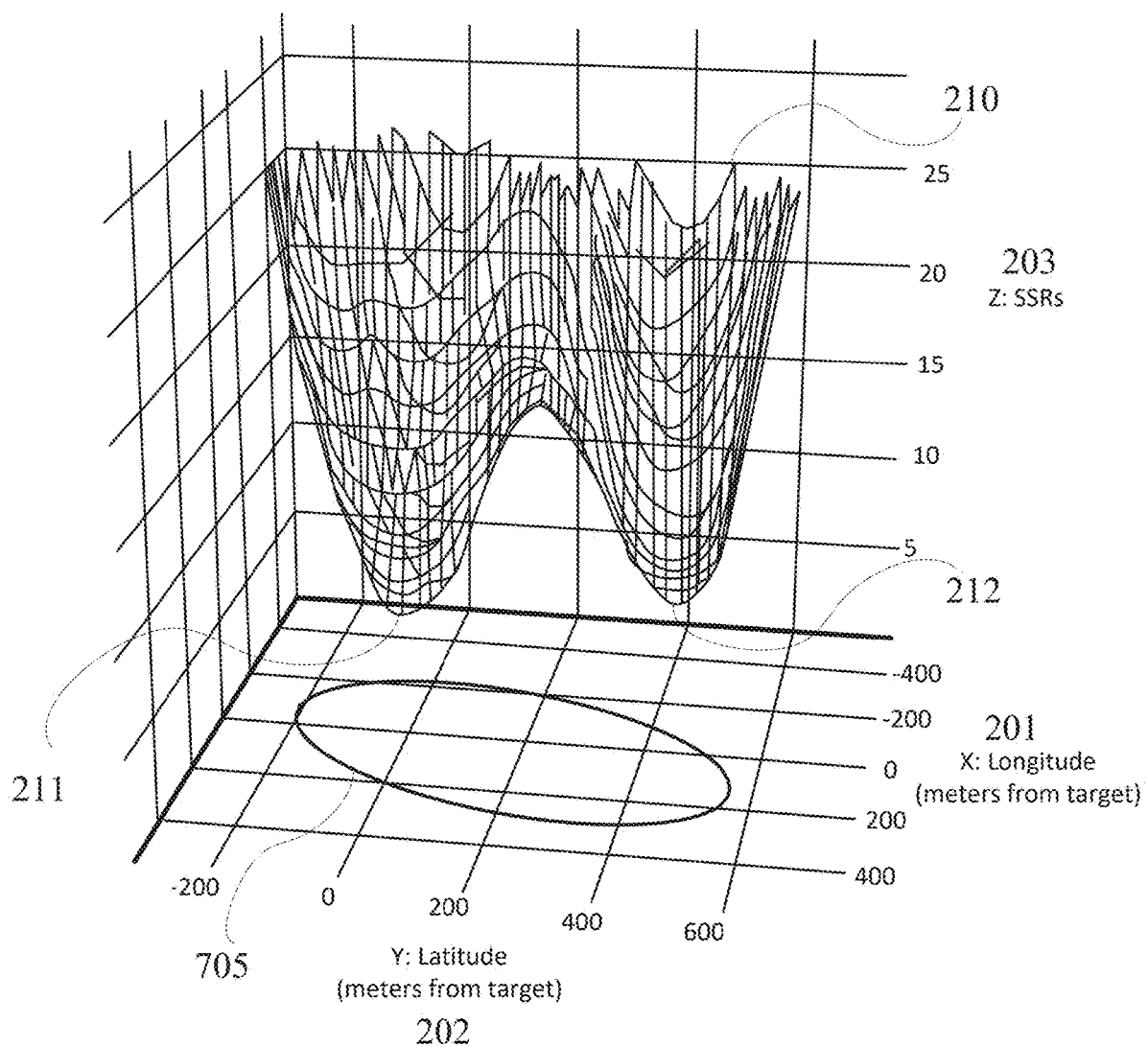
FIG. 8 is a three-dimensional diagram of example data when two SSR minima are present but with a resulting CEP ellipse displayed on the ground plane, in accordance with some embodiments.

FIG. 8 is a three-dimensional diagram of example data when two SSR minima 211 and 212 are present, as shown in FIG. 2, but with the resulting CEP ellipse 705 displayed on the ground plane.

As discussed above with reference to FIG. 2, identifying the presence of two minima 211 and 212 requires, in addition to determining the CEP ellipse 705, the calculation of SSRs for a substantially greater number of points (e.g., on the order of 400). This introduces computational overhead that requires approximately 20 times more processing power. However, as discussed above with reference to FIG. 1, only when the wireless measuring station 110 is travelling along a straight line or a path with little/minimal deviation, there is a likelihood of two possible locations for the target station 120. This can only occur at the initial stage of a survey when determining the location of the target station 120.

Figure 9:
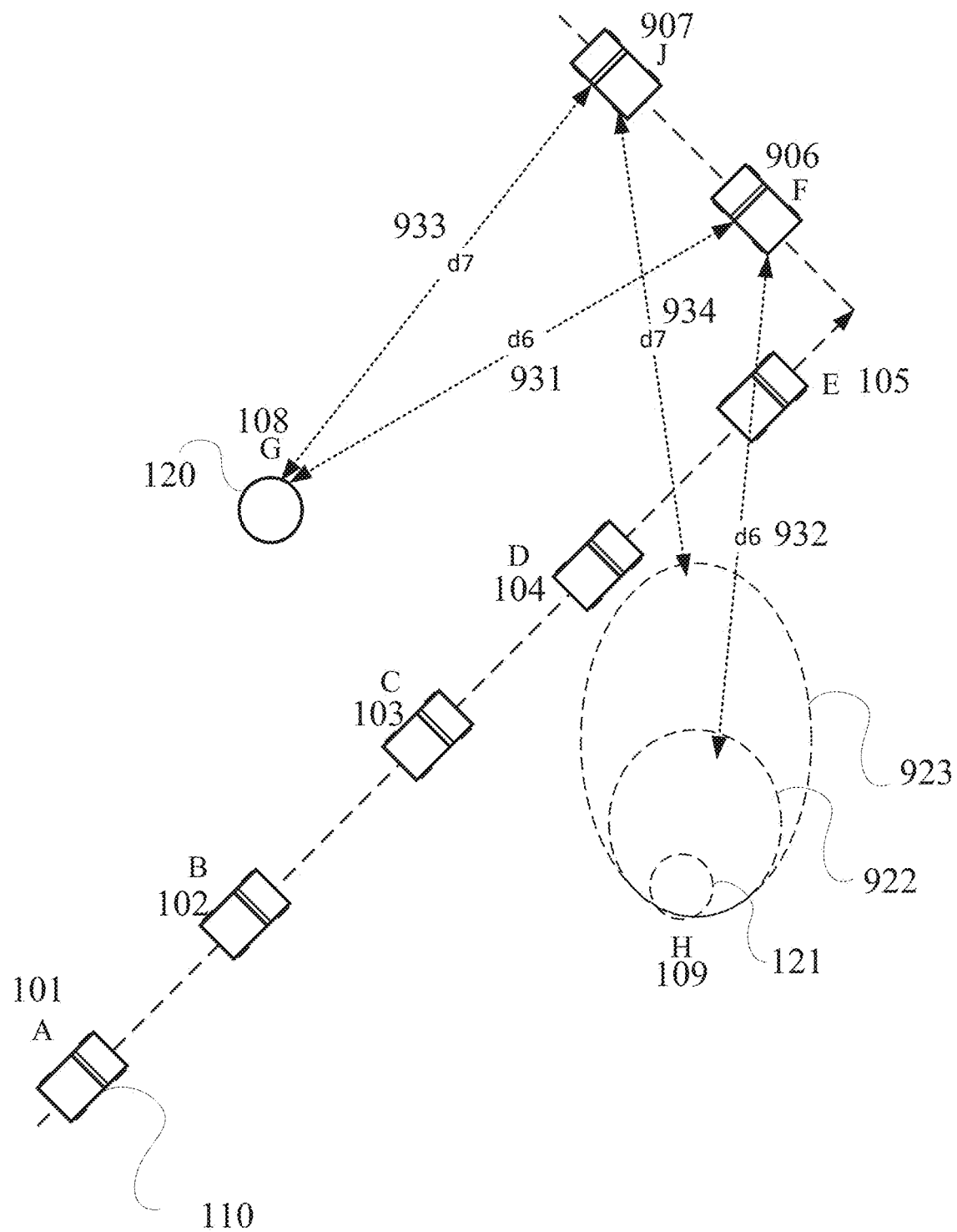
FIG. 9 is a diagram of an example of a wireless measuring station, travelling in a straight path from point A to point E, however, the wireless measuring station takes a left turn after point E, prior to moving to points F and G, in accordance with some embodiments.

Similar to FIG. 1, FIG. 9 illustrates a diagram of an example of a wireless measuring station 110 travelling in a straight path from point A 101 to point E 105. However, in FIG. 9, the wireless measuring station 110 takes a left turn after point E 105, prior to moving to points F 906 and G 907. As discussed above with reference to FIG. 1, RTT measurements taken at points A 101, B 102, C 103, D 104, and E 105 may produce location solutions at G 108 (the true location of target station 120) and H 109 (the mirror location), with corresponding CEPs that may be expected to be similar in size. When the wireless measuring station 110 is at position F 906, the RTT measured corresponds to distance d6 931 from point G 108. In the example of FIG. 9, the distance d6 931, when applied to the calculation of location H 109, is shorter than the actual distance from point H 109, resulting in the equivalent SSR minimum for H 109 being reduced as depicted by ellipse 922. Similarly, when the wireless measuring station 110 is at position J 907, the RTT measured for point G 108 corresponds to distance d7 933. If this RTT measurement is used to derive the CEP for location H 109, the resulting distance d7 934 will further cause the mirror location H 109 to be less likely a solution for the minimum SSR, as depicted by ellipse 923. Hence, as the travel path of the wireless measuring station 110 deviates from a straight line, the probability of selecting location H 109 as the target station 120 location decreases.

Therefore, it is only necessary to perform the extra calculations to look for two minima when the travel path of wireless measuring station 110 is substantially straight. If the path involves turns or significantly deviates from a straight line, it may be assumed that two minima will not be present.

A method is disclosed herein that determines a deviation threshold for the path of wireless measuring station 110 beyond which it is not necessary to perform extra calculations and search for two minima.

For each RTT measurement, the position, $(x_i, y_i)$ of the wireless measuring station 110 is recorded. The averages of the positions, $(x_{ave}, y_{ave})$ may first be calculated:

$$x_{ave} = \frac{\sum_{i=0}^{N} x_i}{N} \quad y_{ave} = \frac{\sum_{i=0}^{N} y_i}{N}. \tag{7}$$

To determine the deviation in a path, a second order moment of position tensor may be used. A second moment, two-dimensional Tensor M may be defined as follows:
where $$M = \begin{bmatrix} M_{xx} & -M_{xy} \\ -M_{yx} & M_{yy} \end{bmatrix} \text{ where} \tag{8}$$

$$M_{xx} = \sum_{i=0}^{N} (y_i - y_{ave})^2,$$

$$M_{yy} = \sum_{i=0}^{N} (x_i - x_{ave})^2, \text{ and}$$

$$M_{xy} = M_{yx} = \sum_{i=0}^{N} (x_i - x_{ave}) \times (y_i - y_{ave}).$$

and

Solving for the eigenvalues, $\lambda_1$ and $\lambda_2$, of M will indicate the extent of the alignment of the points or the spread in the data set.

$$|M - \lambda I| = 0$$

Major eigenvalue 21 has an eigenfunction at 90 degrees with respect to the prevailing path and roughly measures the length of the path. Minor eigenvalue 12 has an eigenfunction along the path and roughly measures the spread of the path from the prevailing direction. A dimensionless path deviation factor $P_{dev}$ may then be defined as the ratio of the eigenvalues, which is an indication of path straightness:

$$P_{dev} = \lambda_1 / \lambda_2 \tag{9}.$$

The path deviation factor $P_{dev}$ has a value that ranges from 0, which corresponds to a straight-line path, to 1, which corresponds to the maximum deviation from a straight path. A preset threshold value P for $P_{dev}$ may be defined. If $P_{dev} < P$, the extra processing to search for two minima is required. Conversely, if $P_{dev} > P$, the extra processing to search for two minima is not required. By way of example and not limitation, a value of P between 0.1 and 0.15 may be used.

Figure 10:
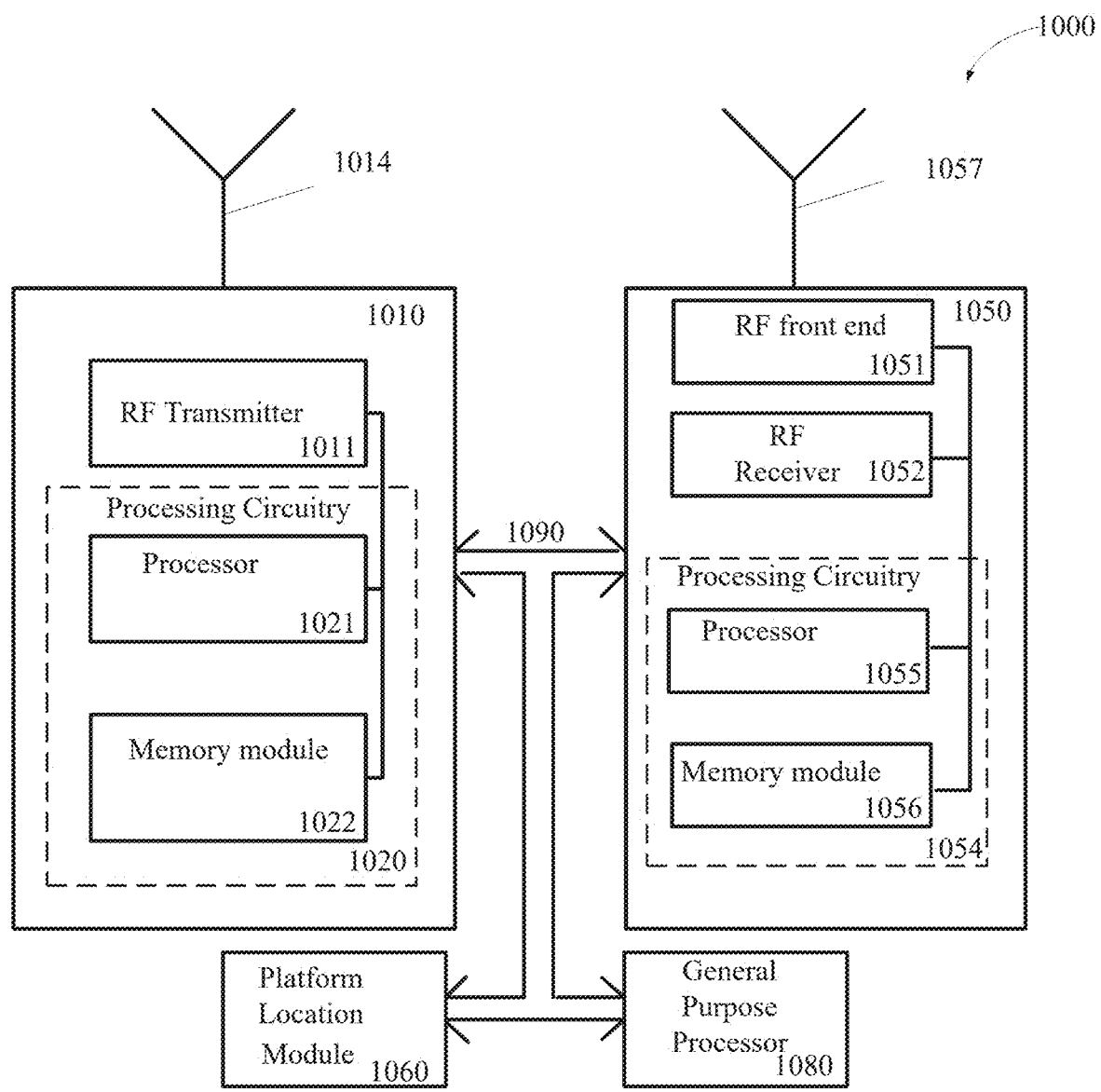
FIG. 10 illustrates a block diagram of an example wireless communication device which may be used as, or as part of, a wireless measuring station, in accordance with some embodiments.

FIG. 10 illustrates a block diagram of an example wireless communication device 1000 which, according to an embodiment of the disclosure, may be used as, or as part of, the wireless measuring station 110. Wireless communication device 1000 may be any device capable of wirelessly receiving signals and transmitting signals, and may be configured to execute any of the methods of the signals of interest (e.g., IEEE 802.11 (Wi-Fi) or Bluetooth® technology). Wireless communication device 1000 may be one or more stations, access points or masters, and the like. Wireless communication device 1000 may be one or more wireless devices that are based upon the IEEE 802.11-2020 specification and each may be configured to act as a transmitter or a receiver. Wireless communication device 1000 may be one or more wireless devices that are based upon specification of the Bluetooth® System and each may be configured to act as a transmitter or a receiver. In the embodiment described herein, wireless communication device 1000 further includes a wireless transmitter 1010 and a wireless receiver 1050. The wireless communication device 1000 may also include a platform location module 1060 and a general purpose processor 1080 which are interconnected (i.e., communicatively and electrically coupled) to the wireless transmitter 1010 and the wireless receiver 1050 by a data bus 1090.

In some embodiments, the wireless transmitter 1010 includes an RF transmitter 1011 and processing circuitry 1020 that includes processor 1021, and memory module 1022. The RF transmitter 1011 may perform the functions of modulation and amplification for the transmission of wireless packets via antenna 1014. In some embodiments processing circuitry 1020 and/or processor 1021 may include integrated circuitry for processing and/or control, e.g., one or more processors, and/or processor cores, and/or FPGAs (Field Programmable Gate Array), and/or ASICs (Application Specific Integrated Circuitry) configured to execute programmatic software instructions. In some embodiments, some functions of RF transmitter 1011 may be performed by processing circuitry 1020. Processing circuitry 1020 may be configured to control any of the methods and/or processes described herein and/or to cause such methods, and/or processes to be performed, e.g., by RF transmitter 1011. Memory module 1022 may be configured to store data, programmatic software code and/or other information described herein. In some embodiments, the software may include instructions that, when executed by the processing circuitry 1020, cause the processing circuitry 1020 to perform the processes described herein with respect to the wireless transmitter 1010.

In some embodiments, wireless receiver 1050 includes an RF front-end 1051, an RF receiver 1052, and processing circuitry 1054 that includes a processor 1055 and a memory module 1056. RF front-end 1051 may perform functions such as low noise amplification, filtering and frequency down conversion so as to condition the received signal suitable for inputting to RF receiver 1052. RF receiver 1052 may demodulate the packets received via antenna 1057 and RF front-end 1051. In some embodiments, wireless transmitter 1010 and wireless receiver 1050 may share the same antenna array along with appropriate RF switches, combiners and splitters.

In some embodiments, RF receiver 1052 and/or processing circuitry 1054 may include integrated circuitry for processing and/or control, e.g., one or more processors, and/or processor cores, and/or FPGAs, ASICs configured to execute programmatic software instructions. In some embodiments, some functions of RF receiver 1052 may be performed by processing circuitry 1054. Processing circuitry 1054 may be configured to control any of the methods and/or processes described herein and/or to cause such methods, and/or processes to be performed, e.g., by wireless receiver 1050. Memory module 1056 may be configured to store data, programmatic software code and/or other information described herein. In some embodiments, the software may include instructions that, when executed by processing circuitry 1054, cause processing circuitry 1054 to perform the processes described herein with respect to wireless receiver 1050.

According to an embodiment of the disclosure, wireless receiver 1050 may be configured to measure and monitor attributes of an input signal, such as one or more of (i) a signal transmitted by wireless transmitter 1010, (ii) data and control packets, and (iii) the response signal, including control packets, transmitted by a station, access point, master or slave. Such packets may include data null, ACK, RTS, CTS, Null, or Poll packets. Memory module 1056 may store instructions for executing any method mentioned in relevant standard(s) of the signal(s) of interest, input signals, and processing results from processor 1055, signals to be outputted and the like. Processing circuitry 1054 may output to general purpose processor 1080 attributes of an exchange of packets, such as RTTs.

According to an embodiment of the disclosure, RF transmitter 1011 may be configured to transmit signals, and processing circuitry 1020 may be configured to prepare the transmitted signal attributes based upon, for example, the IEEE 802.11-2020 or the Standard Bluetooth® System or the like. Such transmitted packets may include data packets, control packets and management packets. Such control packets may include RTS packets, paging and Polls. Memory module 1022 may store instructions for executing any method mentioned in the relevant specification, input signals, and processing results from processor 1021, signals to be outputted and the like.

According to another embodiment of the disclosure, wireless receiver 1050 may be configured to receive the transmissions of another wireless communications device, e.g., target station 120, and processing circuitry 1054 may be configured to monitor attributes of the transmission of the other wireless communication devices and determine the received times of packets from the other wireless communication device, as discussed above with reference to FIG. 1.

According to an embodiment of the disclosure, wireless transmitter 1010 may be configured to transmit packets to another wireless communication device, and processor 1021 may be configured to prepare the attributes of the packet(s) to be transmitted.

According to an embodiment of the disclosure, general purpose processor 1080 may be used to control the operations of the wireless communication device 1000 and in particular the wireless transmitter 1010 and wireless receiver 1050. General purpose processor 1080 may (i) provide an interface to a user via, for example, a keyboard, a mouse and a display that enables a user to select the attributes of the target (i.e., wireless target station 120); (ii) control the start and stop of the transmissions of packets; and (iii) perform the calculations described herein, including calculating RTTs from a target station 120. General purpose processor 1080 may also carry out the various calculations as described in this disclosure, such as, (i) assessing the deviation of wireless communication device 1000 from a straight path, (ii) processing the SSRs, and (iii) determining a location for the target station 120. General purpose processor 1080 may also prepare the measurement results for presentation to an operator or user. In some embodiments, general purpose processor 1080 may include integrated circuitry for processing and/or control, e.g., one or more processors, and/or processor cores, and/or FPGAs, and/or ASICs configured to execute programmatic software instructions, and may include a memory module to execute programmatic code stored in the general purpose processor or another device. It is also noted that the elements of the wireless communication device 1000 may be included in a single physical device/housing or may be distributed among several different physical devices/housings.

According to an embodiment of the disclosure, platform location module 1060 may be used to input, via the data bus 1090, to the general purpose processor 1080, and/or the processing circuitry 1020, and/or 1054 the location of the platform that is carrying the wireless communication device 1000. Platform location module 1060 may include navigation equipment such as a global positioning system (GPS) receiver and/or a gyroscope, and may provide both the location and a heading direction of the wireless communication device 1000 to the general purpose processor 1080 and processing circuitries 1020 and 1054. The location and the heading direction of the wireless communication device 1000, together with the RTTs, may be used by general purpose processor 1080 to calculate and display the location of the target (i.e., wireless target station 120) and control the size of the resultant CEPs.

Figure 11:
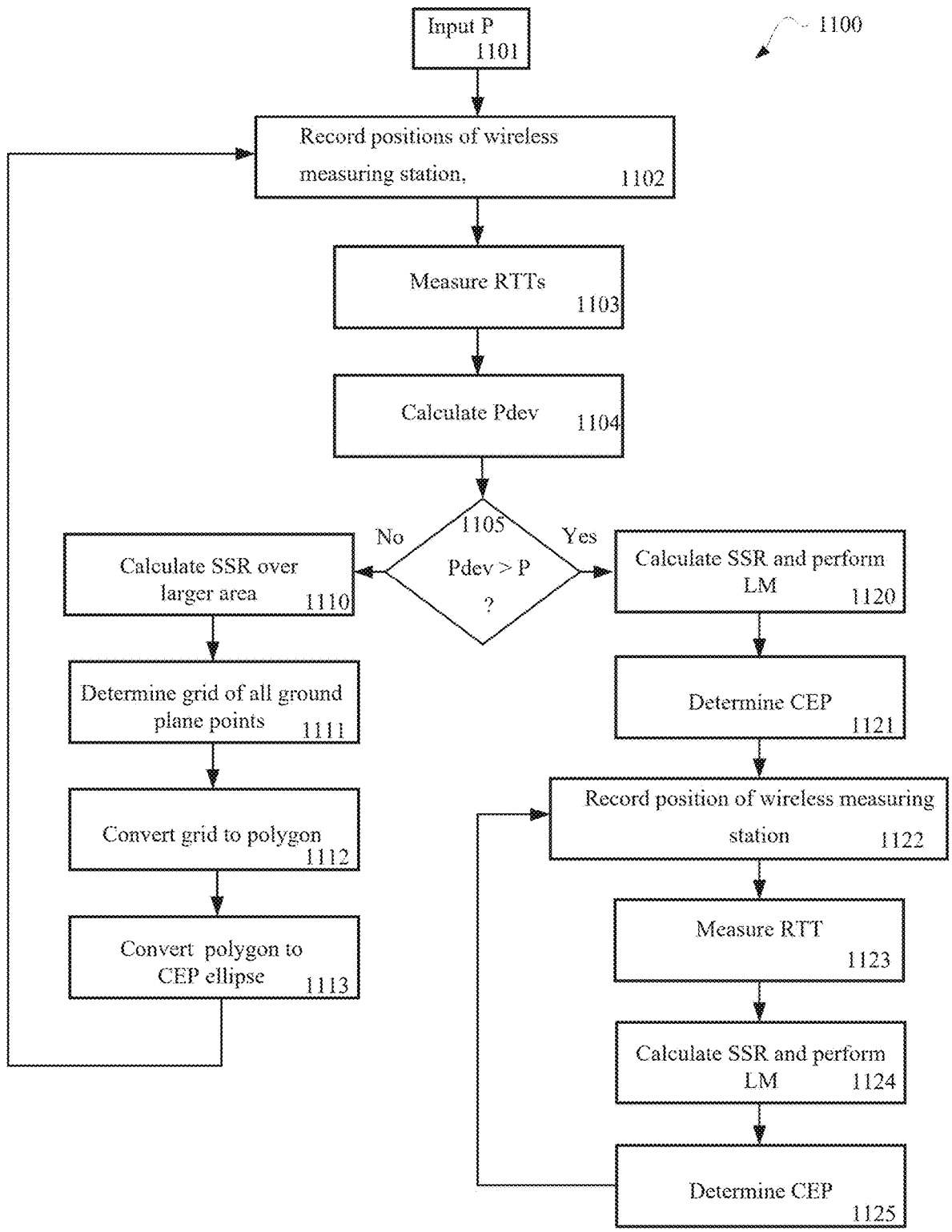
FIG. 11 is a flowchart of an example process for identifying the condition for dual minima and CEP derivation, in accordance with some embodiments.

FIG. 11 is a flowchart of an example process 1100 for identifying the condition for dual minima and CEP derivation. Process 1100 may start at step 1101, where a value for P, the limit for the path deviation factor $P_{dev}$, is entered. This value may be preprogrammed and stored in memory module 1056 or entered by a user via general purpose processor 1080. At step 1102, the positions of the wireless measuring station 110 are recorded each time a transmission takes place. At step 1103, the RTT to target station 120 is measured. For each RTT determination, a ranging packet addressed to the target station 120 is transmitted. The ranging packet may be transmitted by RF transmitter 1011 via antenna 1014. The format of the ranging packets may be supplied by the processing circuitry 1020 using information, such as the target station address entered by a user via general purpose processor 1080.

Ranging packets may be received by wireless receiver 1050, with the TODs of each ranging packet recorded in memory module 1056. Response packets may be received from the target station 120 via antenna 1057 and RF front-end 1051, then demodulated by RF receiver 1052. The TOA of each response packet may also be recorded in memory module 1056. The RTTs, for each of the ranging packet, response packet exchanges may be determined and recorded in processing circuitry 1054 and/or general purpose processor 1080.

After a sufficient number of RTTs have been received to enable a location to be calculated, the process 1100 advances to step 1104, where the value of P dev may be calculated as discussed above with reference to equations (7) to (9). The positions of the wireless measuring station 110, recorded in step 1102, may be used to calculate P dev. The P dev calculations may take place in the general purpose processor 1080. At step 1105, the value of P dev is compared to a threshold value P.

If at step 1105 it is determined that the value of P dev is less than P, then at step 1110, the extended SSR calculations are carried out as discussed above with reference to FIG. 2. At step 1111, the grid comprising all ground plane points where the SSR is less than the average boundary value of the Levenberg-Marquardt covariance ellipse is derived, as discussed above with reference to FIG. 3. At step 1112, the grid is converted into a polygon as discussed above with reference to FIGS. 4, 5 and 6. At step 1113, the polygon is converted into a CEP ellipse, as discussed above with reference to FIGS. 7 and 8. Process 1100 then returns to step 1102. The calculations required for steps 1105 to 1113 may be performed by general purpose processor 1080 and/or by processing circuitry 1054.

If, at step 1105, P dev is greater than P, then it is assumed that the conditions for the presence of two SSR minima no longer exist, and the process 1100 moves to steps 1120 and 1121. At steps 1120, the SSRs may be calculated and, at step 1121 the CEP may be determined, as discussed above with reference to equations (1) to (6). The calculations required for steps 1120 and 1121 may be performed by general purpose processor 1080 and/or by processing circuitry 1054. Since the path deviation P dev has been determined at step 1105 to have a sufficient deviation, there is no requirement to carry out the extended SSR calculations. Hence, after step 1121, process 1100 continues with steps 1122, 1123, 1124, and 1125, which are identical to steps 1102, 1103, 1120, and 1121. Steps 1122, 1123, 1124, and 1125 are repeated, as the wireless measuring station 110 moves to different positions.

SOME EMBODIMENTS

Some embodiments may include any of the following:

A1. A method in for determining a confidence ellipse (CEP) that encompasses possible locations of one or more target devices. The method includes recording a plurality of positions of a wireless device (WD) and performing a measurement of round trip times (RTT) between a target device and the WD at each position of the WD; for the WD, calculating a path deviation from a straight path; determining whether the path deviation is less than a preset value; and in response to the path deviation being less than the preset value, calculating a sum of squared residual (SSR) values to encompass two possible minima; deriving a grid composed of all ground plane points for which the SSR values are (i) less than a boundary value, and (ii) include the SSR values corresponding to the two possible minima; converting the ground plane points in the grid into a polygon that encompasses the grid; and converting the polygon into the CEP, where the CEP encompasses two possible locations of the target device.

A2. The method in clause A1 can include any of the following components or features, in any combination. The path deviation of the first WD is determined by a ratio of eigenvalues of a second order position tensor.

A3. The method in clause A1 can further include converting the polygon into the CEP by rotating principal axes of the polygon to align the principal axes with a latitude (y) component and a longitude (x) component; adjusting the x and y components of the polygon to produce an adjusted polygon so that x and y moments are identical; deriving a circle that encompasses the adjusted polygon; reversing the adjusting of the x and y components; and reversing the rotating of the principal axes of the polygon. Deriving the circle that encompasses the adjusted polygon includes applying Welzl's algorithm to determine a smallest enclosing circle. Calculating the path deviation includes calculating average position values of the WD from the plurality of recorded positions; determining a second order moment tensor from the recorded positions; and calculating a ratio of a minor eigenvalue to a major eigenvalue of the second order moment tensor as the path deviation. Deriving the grid composed of all ground plane points includes removing all containing points not having a second nearest non-containing neighbor on the grid, where removing the containing points includes performing a boundary refinement procedure by rows and columns for non-convex shapes. Converting the ground plane points in the grid into the polygon includes sequentially connecting adjacent outer points of the grid to form a continuous closed shape.

In response to the path deviation being greater than or equal to the preset value, the method in clause A1 further includes calculating the SSR values for a single minimum and deriving the CEP from the SSR values without performing calculations to identify the two possible minima, where the SSR values for the single minimum are calculated without generating the grid composed of the ground plane points.

ADDITIONAL CONSIDERATIONS

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that may be executed by a computer. Any suitable tangible computer readable medium may be utilized including hard disks, solid state drives, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that may direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the details of converting the ground plane grid into a polygon, the method of the fitting of that polygon to an equivalent ellipse, the details of the path deviation derivation and the value of the path deviation limit, the details of the minimization scheme used for the RTT fitting process, the value of RTTs for the ground plane grid projection. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for determining a confidence ellipse (CEP) that encompasses possible locations of one or more target devices, the method comprising:
   recording a plurality of positions for a wireless device (WD); performing a measurement of a round trip time (RTT) between a target device and the WD at each position of the WD;
   for the WD, calculating a path deviation from a straight path;
   determining whether the path deviation is less than a preset value; and
   in response to the path deviation being less than the preset value:
      calculating a sum of squared residual (SSR) values so that the SSR values encompass two possible minima;
      deriving a grid composed of all ground plane points for which the SSR values are (i) less than a boundary value, and (ii) include the SSR values corresponding to the two possible minima;
      converting the ground plane points in the grid into a polygon that encompasses the grid; and
      converting the polygon into the CEP, wherein the CEP encompasses two possible locations of the target device.

2. The method of claim 1, wherein the path deviation of the WD is determined by a ratio of eigenvalues of a second order position tensor.

3. The method of claim 1, wherein the grid composed of all the ground plane points corresponds to locations of all points that lie at or below the SSR values of the CEP based on a presumed curvature at point (0, 0).

4. The method of claim 1, wherein converting the polygon into the CEP comprises:
   rotating principal axes of the polygon to align the principal axes with a latitude (y) component and a longitude (x) component;
   adjusting the x and y components of the polygon to produce an adjusted polygon so that x and y moments are identical;
   deriving a circle that encompasses the adjusted polygon;
   reversing the adjusting of the x and y components; and
   reversing the rotating of the principal axes of the polygon.

5. The method of claim 4, wherein deriving the circle that encompasses the adjusted polygon comprises applying Welzl's algorithm to determine a smallest enclosing circle.

6. The method of claim 1, wherein calculating the path deviation comprises:
   calculating average position values of the WD from the plurality of recorded positions;
   determining a second order moment tensor from the recorded positions; and
   calculating a ratio of a minor eigenvalue to a major eigenvalue of the second order moment tensor as the path deviation.

7. The method of claim 1, further comprising:
   in response to the path deviation being greater than or equal to the preset value:
      calculating the SSR values for a single minimum; and
      deriving the CEP from the SSR values without performing calculations to identify the two possible minima.

8. The method of claim 7, wherein the SSR values for the single minimum are calculated without generating the grid composed of the ground plane points.

9. The method of claim 1, wherein deriving the grid composed of all ground plane points comprises:
   removing all containing points not having a second nearest non-containing neighbor on the grid.

10. The method of claim 9, wherein removing the containing points not having the second nearest non-containing neighbor comprises performing a boundary refinement procedure by rows and columns for non-convex shapes.

11. The method of claim 1, wherein converting the ground plane points in the grid into the polygon comprises:

sequentially connecting adjacent outer points of the grid to form a continuous closed shape.

12. A wireless communication device configured to determine a confidence ellipse (CEP) that encompasses possible locations of a target station, the device comprising:
one or more processors
a wireless transmitter configured to transmit data to the target station;
a wireless receiver configured to receive response data from the target station;
a platform location module configured to provide a location and a heading direction of the wireless communication device to the one or more processors; and
a data bus communicatively coupling the wireless transmitter, the wireless receiver, the platform location module, and the one or more processors,
wherein the one or more processors are configured to:
record a plurality of positions of the wireless communication device; perform a measurement of round trip time (RTT) between the wireless communication device and the target device at each position of the wireless communication device;
calculate a path deviation from a straight path of the wireless communication device;
determine whether the path deviation is less than a preset value; and
in response to the path deviation being less than the preset value:
calculate a sum of squared residual (SSR) values to encompass two possible minima;
derive a grid composed of all ground plane points for which the SSR values are (i) less than a boundary value, and (ii) include the SSR values corresponding to the two possible minima;
convert the ground plane points in the grid into a polygon that encompasses the grid; and
convert the polygon into the CEP, wherein the CEP encompasses two possible locations of the target station.

13. The wireless communication device of claim 12, wherein, to determine the path deviation, the one or more processors are further configured to calculate a ratio of eigenvalues of a second order position tensor derived from the recorded positions.

14. The wireless communication device of claim 12, wherein, to convert the polygon into the CEP, the one or more processors are further configured to:
rotate principal axes of the polygon to align the principal axes with a latitude (y) component and a longitude (x) component;
adjust the x and y components of the polygon to produce an adjusted polygon so that x and y moments are identical;
derive a circle that encompasses the adjusted polygon;
reverse the adjusting of the x and y components; and
reverse the rotating of the principal axes of the polygon.

15. The wireless communication device of claim 12, wherein the grid composed of all ground plane points corresponds to locations of all points that lie at or below the SSR values of the CEP based on a presumed curvature at point (0, 0).

16. The wireless communication device of claim 12, wherein, to derive the circle that encompasses the adjusted polygon, the one or more processors are further configured to:
apply Welzl's algorithm to determine a smallest enclosing circle.

17. The wireless communication device of claim 12, wherein, to calculate the path deviation, the one or more processors are further configured to:
calculate average position values of the wireless communication device from the plurality of recorded positions;
determine a second order moment tensor from the recorded positions; and
calculate a ratio of a minor eigenvalue to a major eigenvalue of the second order moment tensor as the path deviation.

18. The wireless communication device of claim 12, wherein the one or more processors are further configured to:
in response to the path deviation being greater than or equal to the preset value:
calculate the SSR values for a single minimum; and
derive the CEP from the SSR values without performing calculations to identify the two minima.

19. The wireless communication device of claim 12, wherein, to derive the grid composed of all ground plane points, the one or more processors are further configured to:
remove all containing points not having a second nearest non-containing neighbor on the grid.

20. The wireless communication device of claim 19, wherein, to remove the containing points not having the second nearest non-containing neighbor, the one or more processors are further configured to:
perform a boundary refinement procedure by rows and columns for non-convex shapes.

* * * * *